United States Patent
Wood

(10) Patent No.: US 10,228,608 B2
(45) Date of Patent: Mar. 12, 2019

(54) CAMERA SLIDER WITH FLYWHEEL

(71) Applicant: Dennis Wood, Thunder Bay (CA)

(72) Inventor: Dennis Wood, Thunder Bay (CA)

( * ) Notice: Subject to any disclaimer, the term of this patent is extended or adjusted under 35 U.S.C. 154(b) by 0 days.

(21) Appl. No.: 15/209,996

(22) Filed: Jul. 14, 2016

(65) Prior Publication Data

US 2018/0017849 A1    Jan. 18, 2018

(51) Int. Cl.
| | |
|---|---|
| *G03B 17/56* | (2006.01) |
| *F16M 11/04* | (2006.01) |
| *F16F 15/02* | (2006.01) |
| *F16M 11/18* | (2006.01) |
| *F16M 11/08* | (2006.01) |

(52) U.S. Cl.
CPC ............ *G03B 17/561* (2013.01); *F16F 15/02* (2013.01); *F16M 11/045* (2013.01); *F16M 11/08* (2013.01); *F16M 11/18* (2013.01)

(58) Field of Classification Search
CPC ..... G03B 17/561; F16F 15/02; F16M 11/045; F16M 11/08; F16M 11/18
USPC ......................................................... 396/421
See application file for complete search history.

(56) References Cited

U.S. PATENT DOCUMENTS

| | | | | |
|---|---|---|---|---|
| 6,264,330 B1 * | 7/2001 | Walton | ..................... | B61C 13/00 104/243 |
| 8,721,199 B1 * | 5/2014 | Hart | ..................... | F16M 11/045 396/428 |
| 2007/0074796 A1 * | 4/2007 | Martin | ..................... | B60C 19/00 152/185 |
| 2012/0321488 A1 * | 12/2012 | Ritterling | ................ | F04B 35/06 417/234 |
| 2013/0235185 A1 * | 9/2013 | Sobotka | .............. | G01M 5/0025 348/125 |
| 2015/0234258 A1 † | 8/2015 | Hida | | |

(Continued)

FOREIGN PATENT DOCUMENTS

| | | |
|---|---|---|
| DE | 102014100156 A1 † | 7/2014 |
| EP | 2808594 A1 † | 12/2014 |

OTHER PUBLICATIONS

DSLR Film Noobs "Polly Systems Polly Dolly" http://www.dslrfilmnoob.com/2013/04/20/polly-systems-polly-dolly/.*

(Continued)

*Primary Examiner* — Clayton E. LaBalle
*Assistant Examiner* — Dennis Hancock
(74) *Attorney, Agent, or Firm* — Ryan W. Dupuis; Ade + Company Inc.; Kyle R Satterwaiter

(57) ABSTRACT

A camera slider assembly for supporting a camera thereon including a frame with a pair of rails and a carriage body that rolls longitudinally along the rails upon which a camera can be supported. A flywheel is supported on the carriage body for rotation relative to the carriage body about a flywheel axis which is movable with the carriage body in the longitudinal direction relative to the frame. A pulley cable is connected between the flywheel and one of the wheels of the carriage body to rotate the flywheel responsive to rolling of the wheels of the carriage body along the rails. A brake member on the carriage body is pivotal on the carriage body between braking and released positions about the same axis as the flywheel. The flywheel can accordingly be rotatably supported upon the brake member to support the flywheel on the carriage body.

20 Claims, 6 Drawing Sheets

(56) References Cited

U.S. PATENT DOCUMENTS

2015/0290490 A1\* 10/2015 Badarneh .......... A63B 22/0023
  482/6
2016/0216596 A1\* 7/2016 Hart .................... G03B 17/561

OTHER PUBLICATIONS

Matthews Studio Equipment "Polly Dolly" https://products.msegrip.com/products/pollydolly.\*
Screen shots of Youtube webpage for the video "iFootage Shark Slider S1" and clips from the video; published on Nov. 7, 2013; and viewable at https://www.youtube.com/watch?v=O0QwzCqfl2s.†

\* cited by examiner
† cited by third party

CAMERA SLIDER WITH FLYWHEEL

FIELD OF THE INVENTION

The present invention relates to a camera slider of the type including a frame with rails and a carriage body which supports a camera thereon for sliding movement along the rails, and more particularly the present invention relates to a camera slider having a flywheel which is supported on the carriage body for movement along the rails together with the carriage body such that the flywheel rotates responsive to the longitudinal displacement along the rails.

BACKGROUND

When filming with a video camera, a common method of capturing video involves displacing the camera along one or more rails using a camera slider. Typical camera slider configurations comprise a pair of rails and a carriage body that rolls along the rails upon which the camera is supported. To ensure a smooth movement of the camera along the rails, a flywheel is sometimes operatively connected to the slider.

Examples of various commercially available sliders with flywheels include i) the Axler Pro Camera Slider with Flywheel available by Gradus Group LLC, ii) the Benro MoveOver Dual Carbon Rail Slider with Flywheel available by Benro Precision Machinery (Zhongshan) Co, Ltd., and iii) the Konova Nitsan Fly Wheel available by Konova of South Korea. In each instance in the prior art, the flywheel rotates about a flywheel axis which is fixed relative to the rails at one end of the rails. Operatively connecting the flywheel to the carriage body which rolls along the rails thus requires a pulley cable to be supported to span the length of the rails. This arrangement is complex in construction and has poor responsiveness between the flywheel rotation and the linear movement along the rails due to great length of the pulley cable spanning a full length of the rails.

SUMMARY OF THE INVENTION

According to one aspect of the invention there is provided a camera slider assembly for supporting a camera thereon, the assembly comprising:

a frame including at least one rail extending in a longitudinal direction;

a carriage body supported on said at least one rail for longitudinal movement along the rail in the longitudinal direction;

a camera mount supported on the carriage body for supporting the camera thereon for movement with the carriage body in the longitudinal direction relative to the frame; and a flywheel supported on the carriage body for rotation relative to the carriage body about a flywheel axis which is movable with the carriage body in the longitudinal direction relative to the frame;

the flywheel being operatively connected to the frame so as to be arranged to rotate about the flywheel axis responsive to movement of the flywheel axis with the carriage body in the longitudinal direction relative to the frame.

By supporting the flywheel for rotation about a flywheel axis which moves with the carriage body and camera relative to the rails, the connection of the flywheel to involves only a short pulley connection or other similar means of direct connection to the rails for accurate responsiveness of the flywheel. The resulting configuration is also simple in construction so as to be reliable and low in cost to manufacture and maintain.

When the camera slider assembly also includes a drive wheel rotatably supported on the carriage body for rolling engagement along said at least one rail as the carriage is displaced in the longitudinal direction, the flywheel is preferably operatively connected to the drive wheel for rotating the flywheel responsive to rotation of the drive wheel as the drive wheel rolls along said at least one rail. In this instance, a pulley cable may be operatively connected between the drive wheel and the flywheel. A resilient gripping material may also be supported about a circumference of the drive wheel for gripping said at least one rail as the drive wheel rolls along said at least one rail.

When the camera slider assembly has two rails which are parallel and spaced apart in a lateral direction from one another, a diameter of the flywheel may correspond approximately to a width between the two rails in the lateral direction. The flywheel axis may be centered in the lateral direction between the two rails and centered in the longitudinal direction relative to the carriage body.

The camera slider assembly preferably also includes a tripod mounting plate on the frame spaced below said at least one rail for coupling the frame to a tripod head. In this instance, the flywheel is preferably supported on a bottom side of the carriage body so as to be received between the tripod mounting plate and said at least one rail as the flywheel is displaced along said at least one rail with the carriage body.

When the tripod mounting plate is connected to the two rails by two supporting portions of frame which are connected between laterally opposed sides of the tripod mounting plate and the two rails respectively, the flywheel is preferably supported on the carriage body so as to be received between the two supporting portions of the frame as the flywheel is displaced along said at least one rail with the carriage body.

The camera slider assembly may further include a brake member pivotally supported on the carriage body for pivotal movement about the flywheel axis between i) a released position disengaged with said at least one rail such that the carriage body is freely movable along said at least one rail and ii) a braking position engaged with said at least one rail such that movement of the carriage body along said at least one rail is frictionally resisted.

When the camera mount comprises an upper mounting plate at a top side of the carriage body, the brake member may be supported on the upper mounting plate by a plurality of mounting fasteners extending through respective mounting slots in the upper mounting plate in which the mounting slots extend circumferentially about the flywheel axis such that the mounting fasteners are circumferentially displaced along the mounting slots as the brake member is pivoted relative to the upper mounting plate of the carriage body between the released position and the braking position thereof.

The flywheel may be rotatably supported on the brake member by providing a hollow cavity in the brake member and an annular bearing member supported within the hollow cavity upon which the flywheel is rotatably supported.

One embodiment of the invention will now be described in conjunction with the accompanying drawings in which:

BRIEF DESCRIPTION OF THE DRAWINGS

FIG. 6 is a perspective view of a bottom side of the upper mounting plate of the carriage body shown in isolation.

In the drawings like characters of reference indicate corresponding parts in the different figures.

DETAILED DESCRIPTION

Figure 1:
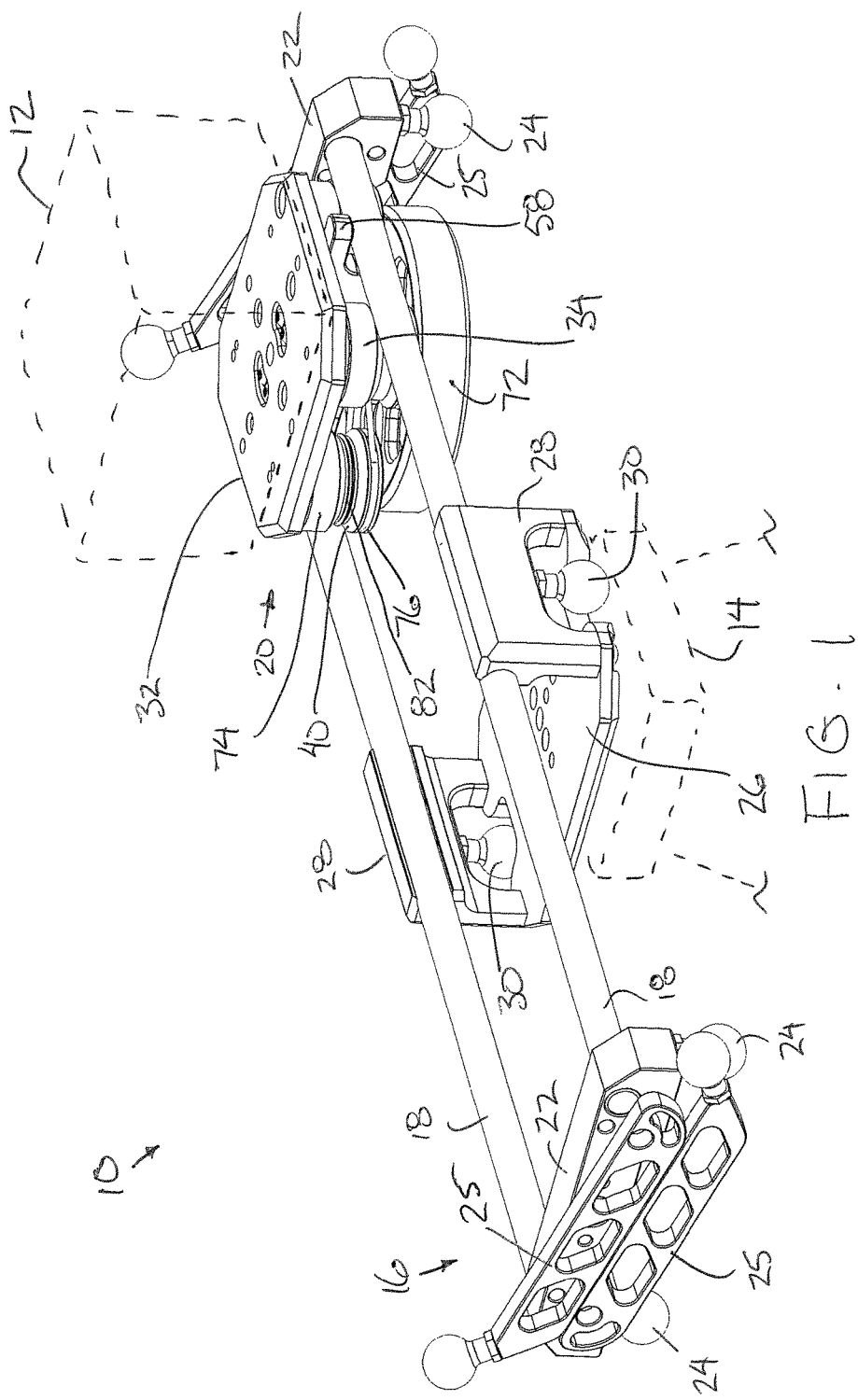
FIG. 1 is perspective view showing a top side of the camera slider assembly.
Figure 2:
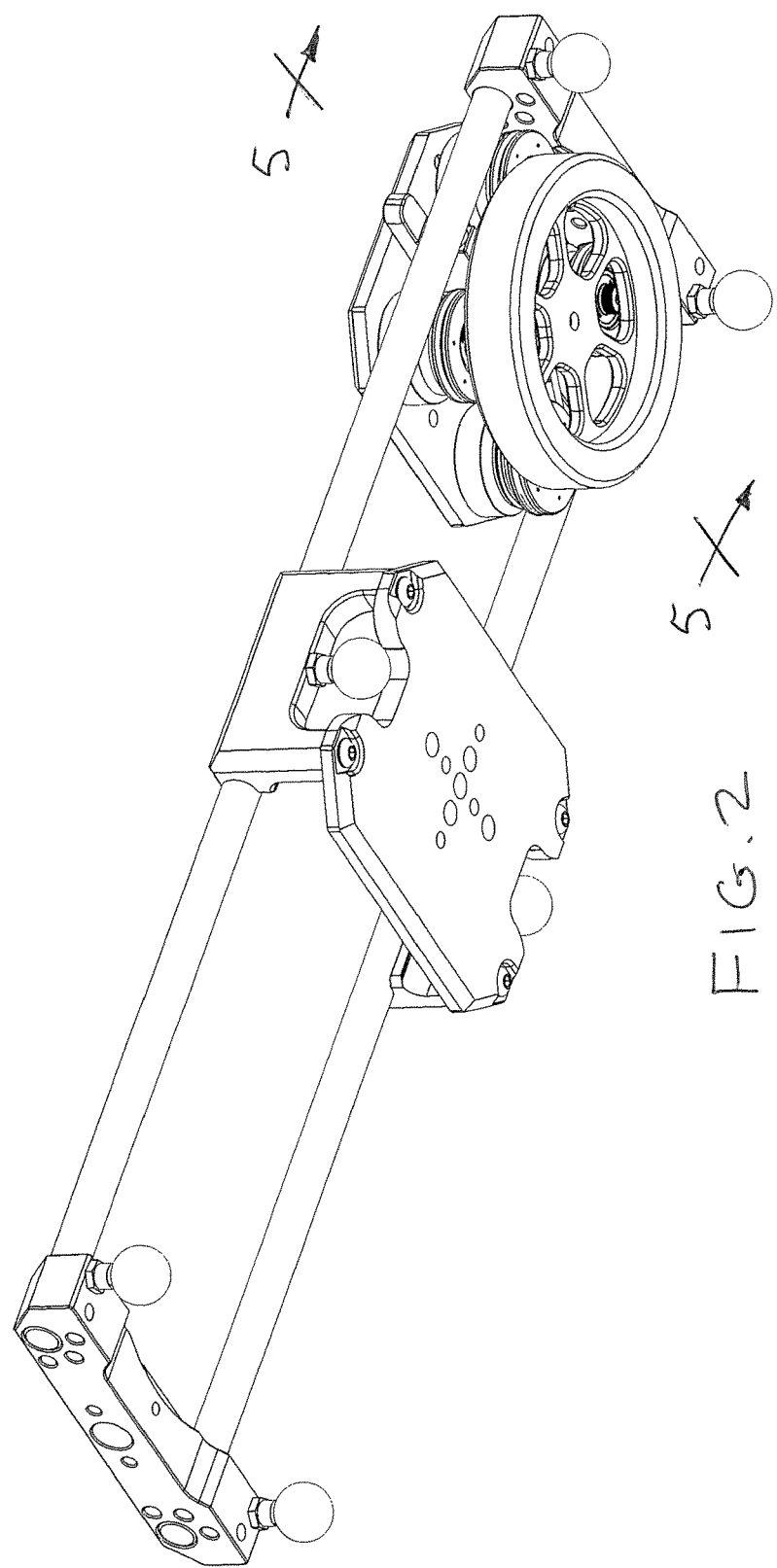
FIG. 2 is a perspective view showing a bottom side of the camera slider assembly with adjustable legs of the frame shown removed for clarity.
Figure 3:
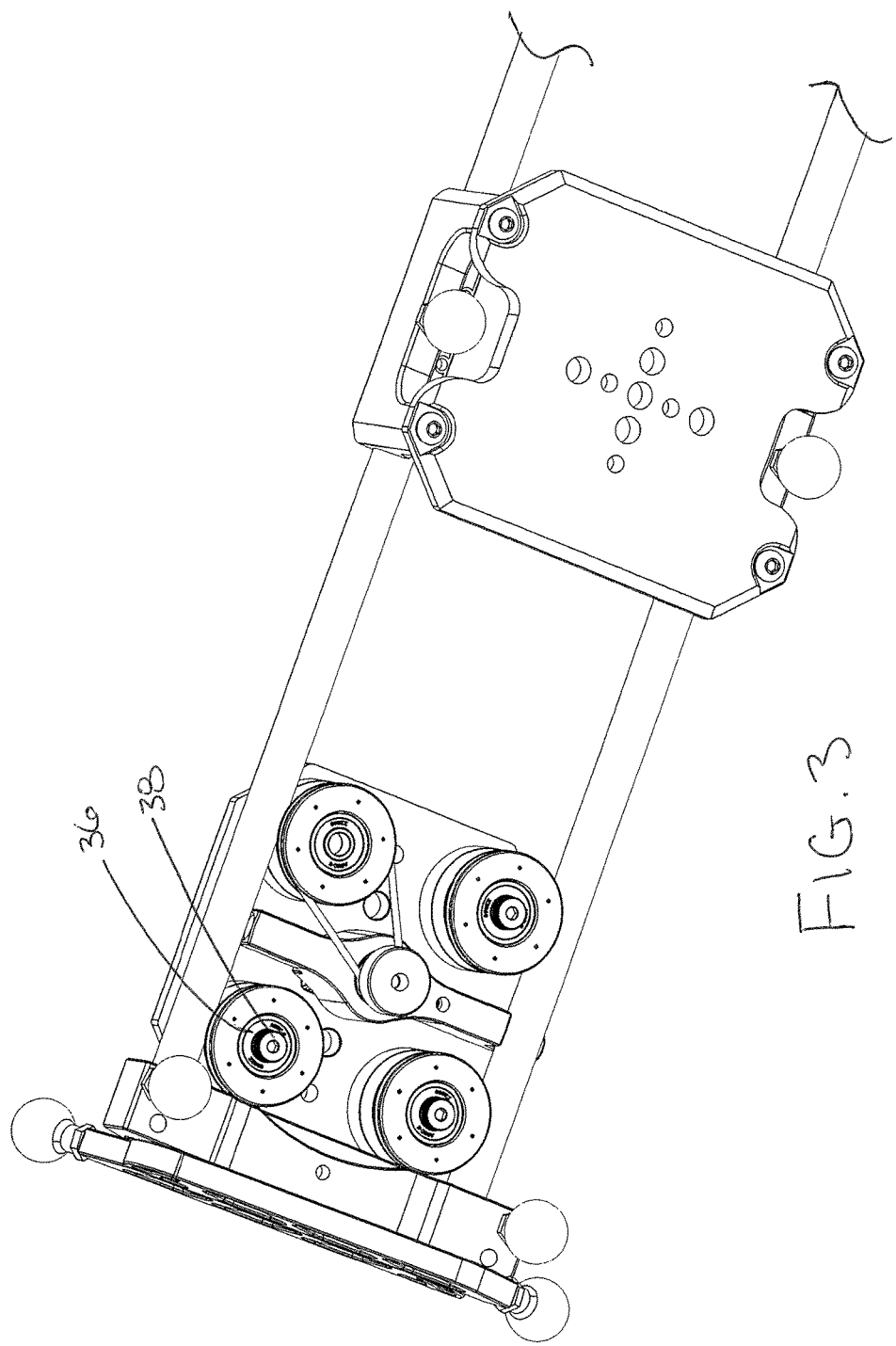
FIG. 3 is a perspective view showing a bottom side of the carriage body with the flywheel removed for clarity.
Figure 4:
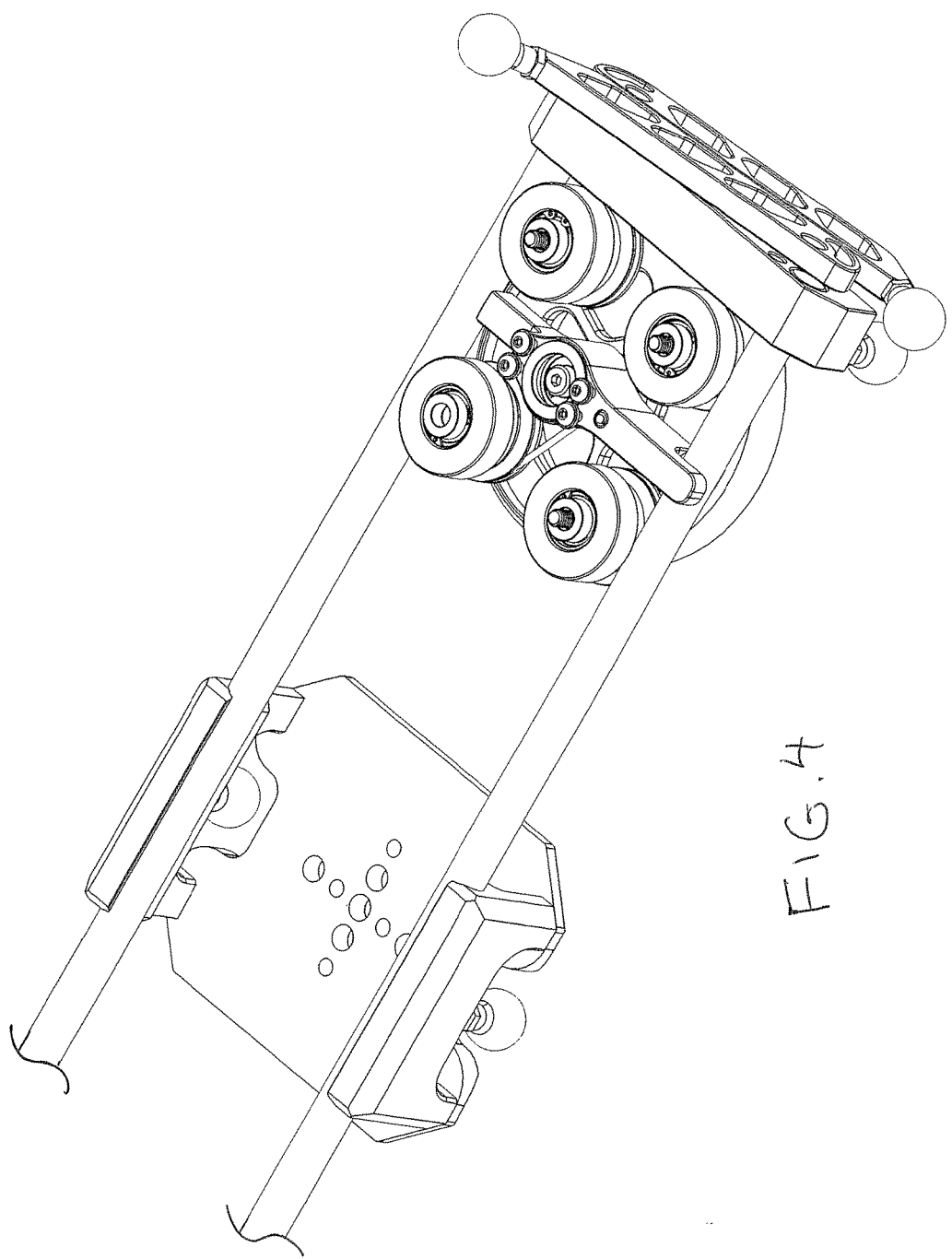
FIG. 4 is a perspective view showing a top side of the carriage body with the upper mounting plate of the carriage body shown removed for clarity.
Figure 5:
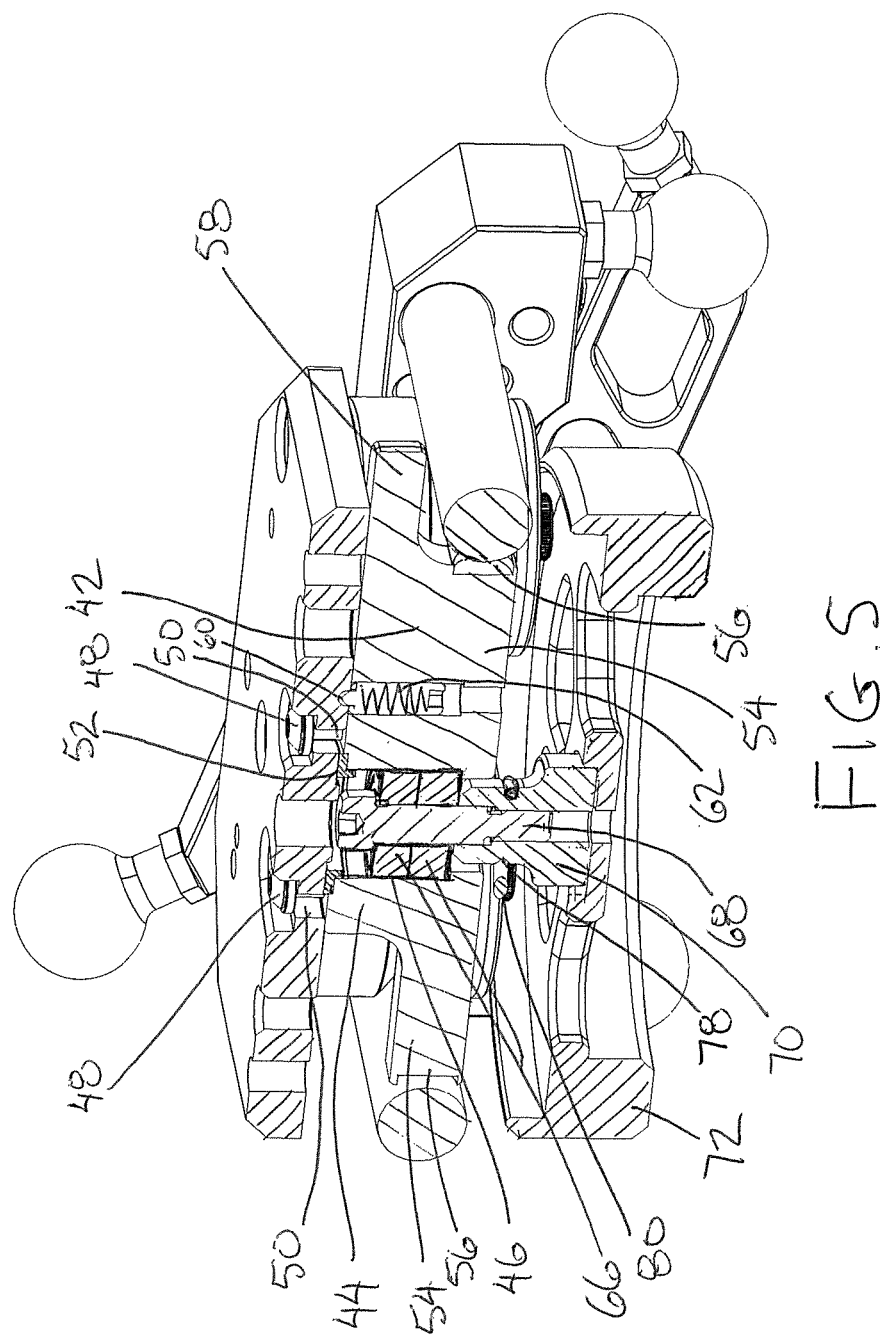
FIG. 5 is a sectional view of the carriage body along the line 5-5 in FIG. 2.
Figure 9:
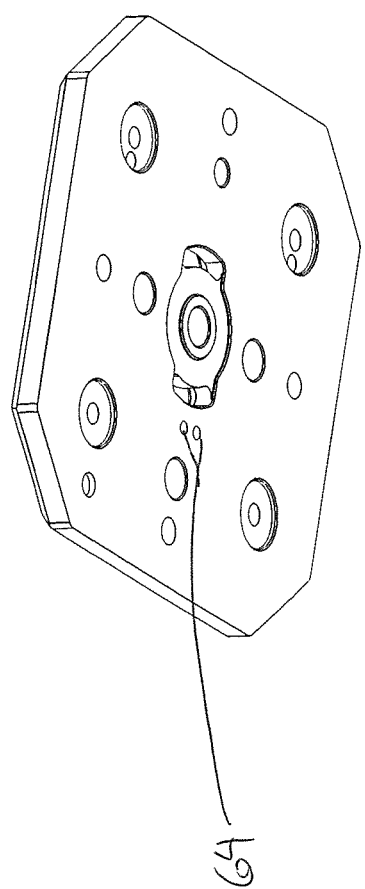

Referring to the accompanying Figures, there is illustrated a camera slider assembly generally indicated by reference numeral 10. The camera slider assembly is particularly suited for supporting a camera 12 thereon which is capable of capturing video. The camera slider assembly 10 is capable of being supported on various supporting surfaces, as well as being supported on a mounting head 14 of a tripod assembly or other similar camera supporting structure for example.

The camera slider assembly 10 generally includes a frame 16 which includes two parallel and spaced apart rails 18 which extend in a longitudinal direction, and a carriage body 20 supported on the rails 18 for movement relative to the frame in the longitudinal direction of the rails.

The rails 18 of the frame comprises a round rods of circular cross-section. The two rods are joined together at longitudinally opposed ends of the frame by two end portions 22 of the frame. Each end portion 22 extends in a lateral direction between respective ends of the rails that one end of the frame. Two feet 24 are mounted on each end portion for supporting the end portions spaced above a suitable supporting surface upon which the feet are engaged. Each foot 24 comprises a spherical ball having a threaded stem protruding radially therefrom for threaded connection to the end portion such that rotation of the stem adjusts the height of the foot relative to the end portion.

A pair of adjustable legs 25 are also pivotally connected to each end portion 22 having respective feet thereon for engaging a supporting surface at various heights relative to the rails if desired.

The frame further includes a tripod mounting plate 26 coupled between the two rails at a location spaced below the rails at a central location in the longitudinal direction between the two end portions 22. The tripod mounting plate 26 is a generally flat rectangular plate which is parallel to a common plane of the two rails. The mounting plate 26 includes a plurality of mounting apertures therein to form a suitable connection to the mounting head 14 of a camera supporting structure therebelow using suitable fasteners.

Two side portions 28 of the frame extend upward from laterally opposing sides of the tripod mounting plate for connection to respective ones of the two rails 18 above the plate 26. Each side portion comprises a rigid body which is generally elongate in the longitudinal direction of the rails which spans a full height between the tripod mounting plate 26 at the bottom end thereof and the rails at the top end thereof. The side portions 28 are coupled to the rails about the outer sides of the rails only such that the inner sides of the rails which face inwardly towards one another remain exposed for supporting the carriage body for rolling movement therealong as described in further detail below.

An adjustable foot 30 is mounted on each side portion to protrude below the bottom side of the tripod the mounting plate 26. Each foot 30 is identical in configuration to the feet 24 of the end portions of the frame so as to be adjustable in height using a threaded shaft. The two feet 30 of the side portions of the frame and the four feet 24 of the end portions of the frame can thus all be adjusted such that the bottom side thereof are aligned within a common plane such that all of the feet can engage a common plane or supporting surface and provide support to the rails without any deflection of the rails.

The carriage body 20 generally includes an upper mounting plate 32 in the form of a flat rectangular plate including a plurality of mounting apertures formed therein to define a camera mount upon which a body of a camera 12 can be secured in fixed relation for example.

The carriage body 20 is supported for rolling movement along the rails by a set of four carriage wheels 34. Each carriage wheel is rotatable about a respective wheel axis which is perpendicular to the upper mounting plate 32. The four wheel axes are oriented in a rectangular configuration relative to one another such that two carriage wheels are arranged for rolling movement along an inner side surface of each of the two rails 18.

Each carriage wheel 34 is supported by annular bearings 36 on a respective mounting post 38. The mounting post 38 is fixed at an upper end to the upper mounting plate and supports a pair of annular bearings 36 at axially spaced positions thereon. Each carriage wheel comprises a sleeve having a hollow cavity therein receiving the annular bearings in a manner which rotatably supports the carriage wheel on the mounting post 38. The sleeve of each wheel includes a concave groove 40 on the outer surface thereof which extends circumferentially about the wheel for mating with the semicircular profile at the inner side of a respective rail upon which the carriage wheel is engaged for rolling movement therealong.

The camera slider assembly further includes a brake member 42 in the form of an elongate body supported beneath the upper mounting plate 32 to extend generally in the lateral direction between the two rails 18. The brake member is pivotally supported about an upright brake axis which is perpendicular to the upper mounting plate and which is centred longitudinally relative to the carriage body and centred laterally relative to the carriage body and the two rails.

The brake member 42 has a body which includes a cylindrical portion 44 at a central location about the brake axis. A cylindrical cavity 46 within the cylindrical portion 44 is surrounded by a peripheral wall. The peripheral wall of the cylindrical portion 44 is connected to the upper mounting plate 32 thereabove by a set of mounting fasteners 48 which are received through respective mounting slots 50 in the upper mounting plate 32. The mounting slots 50 comprise arcuate slots which extend generally in the circumferential direction about the brake axis through a range of a few degrees at diametrically opposing sides of the brake axis so as to be laterally opposed from one another in the lateral direction. Two mounting fasteners 48 extend axially through each mounting slot for threaded connection into the cylindrical portion of the brake member below the plate. The fasteners are arranged for sliding movement along the respective mounting slots as the brake member pivots about the brake axis relative to the upper mounting plate 32.

To assist in centering the brake member about the brake axis relative to the upper mounting plate, a centering ring 52 is provided in the form of an annular bushing received between the top end of the brake member 52 and the bottom surface of the upper mounting plate. More particularly the centering ring 52 is fit within a circular recess formed in the bottom side of the upper mounting plate in alignment about the brake axis. A portion of the centering ring also extends downwardly into the cylindrical cavity 46. The centering ring is formed of a material having a low coefficient of friction such that the brake member is freely pivotal relative to the upper mounting plate about the brake axis.

The body of the brake member further includes two arm portions 54 which extend outwardly from diametrically opposing sides of the cylindrical portion 44 in opposing lateral directions towards respective ones of the two rails. Each arm portion 54 terminates at a respective end face 56 in close proximity to the inner side of a respective one of the rails. More particularly the brake member 42 is pivotal from a released position in which the arm portions 54 are perpendicular to the rails and the end faces are disengaged from the rails such that the carriage body freely slides or rolls along the rails, to a braking position in which the arm portions 54 are angularly offset from the released position by a few degrees such that the end faces 56 engage and grip the inner sides of the two rails respectively to frictionally resist movement of the carriage body in the longitudinal direction along the rails.

The brake member further includes an actuator lever 58 on the body which is integral with one of the arm portions 54 to extend radially outward beyond the end face of the respective arm portion 42 at a location which is above the end face, and above the corresponding rail 18. The outer free end of the lever also protrudes laterally outwardly beyond the upper mounting plate for ready access by an operator of the assembly to grip the free end of the lever and displace the brake member between the braking and released positions thereof.

A retainer pin 60 is received within an axially oriented bore within the body of the brake member 42 and is biased by a spring 62 within the bore to protrude upwardly beyond the upper surface of the brake member. The retention pin 60 is aligned with a corresponding retention aperture 64 in the bottom surface of the upper mounting plate in each of the braking position and the released position of the brake member. The retention pin thus serves to retain the braking member in a selected one of the braking position or the released position. By applying force to the actuation lever 58 however, the retention pin can be retracted against the biasing of the spring 62 to release the retention pin from the corresponding retention aperture to enable ready displacement of the braking member between the released position and the braking position thereof.

The cylindrical cavity 46 within the body of the brake member 42 supports a pair of annular bearings 66 therein. An axial fastener extends through the annular bearings for fastening to a central shaft 70 protruding from the bottom side of the brake member at the brake axis. The shaft 70 mounts a flywheel 72 on the bottom end thereof such that the flywheel and the shaft are rotatable together on the bearings 66 relative to the brake member 42 and the carriage body thereabove about a flywheel axis which is coaxial and coincident with the brake axis of the brake member 42.

The flywheel 72 has a diameter which is much greater than the axial height of the flywheel. More particularly the diameter of the flywheel corresponds approximately to the centre to centre width between the two rails 18 in the lateral direction. In addition, the diameter of the flywheel fits between the lateral distance between the two side portions 28 of the frame which support the rails above the tripod mounting plate 26. The height of the shaft and flywheel is such that the flywheel is also received between the rails thereabove, and the tripod mounting plate 26 therebelow.

One of the carriage wheels 34 comprises a drive wheel 74 in which an annular pulley groove 76 extends circumferentially about the wheel at a location spaced axially below the concave groove 40 which mates with the respective rail. The shaft 70 of the flywheel similarly includes an annular pulley groove 78 such that the pulley grooves lie in a common plane parallel to a plane of the rails. A pulley cable 80 in the form of an endless loop extends about both the drive wheel and the shaft of the flywheel to be received within the respective annular pulley grooves 76 and 78. In this manner, as evidenced in the figures, the drive wheel has a pulley portion that receives the pulley cable and that has a first diameter and the flywheel has a pulley portion that receives the pulley cable and that has a second diameter, in which the first diameter is approximately 4 times larger than the second diameter, such that a first rate of rotation of the flywheel about the flywheel axis is greater than a second rate of rotation of the drive wheel about the drive wheel axis. The pulley cable comprises any suitable belt or chain which permits operative connection between the flywheel and the drive wheel such that the flywheel is rotated responsive to the rolling movement of the drive wheel along the respective rail and the corresponding linear displacement of the carriage body in the longitudinal direction of the rails.

The drive wheel 74 also includes a grip ring 82 of resilient material having a high coefficient of friction, for example rubber, which extends circumferentially about the drive wheel within the concave groove 40 mated with the respective rail. The material of the grip ring 82 thus engages between the rail and the drive wheel as the drive wheel rolls along the rail to ensure the drive wheel does not slip relative to the rail as the carriage body is displaced in the longitudinal direction along the rails. In this manner, when the two rails lie within a common lateral plane and the drive wheel axis and the flywheel axis are oriented perpendicularly to the common lateral plane of the two rails as illustrated in the figures and described above, the drive wheel rotates within the common lateral plane of the two rails and the flywheel rotates within a plane of rotation that is parallel to the common lateral plane of the two rails. The resilient gripping material about the drive wheel that is received between the two rails is thus in gripping engagement with an inner side surface of one of the rails.

Various modifications can be made in my invention as herein above described, and many apparently widely different embodiments of same made.

For example, in further embodiments the brake member 42 and the flywheel may be independently supported relative to the upper mounting plate of the carriage body for pivotal movement about independent axes relative to the carriage body. Furthermore, more than one of the carriage wheels may comprise a drive wheel operatively connected to the flywheel to drive rotation of the flywheel as the carriage body is displaced in the longitudinal direction of the rails.

In yet a further arrangement two drive wheels at laterally opposing sides of the carriage body may have diameters which are arranged such that the drive wheels contact one another in a counter-rotating configuration. The pulley cable in this instance may be received between the two drive wheels so as to be gripped and clamped between the two drive wheels as the drive wheels are counter-rotated to ensure a firm, non-slip relationship between the pulley cable and the drive wheels.

It is intended that all matter contained in the accompanying specification shall be interpreted as illustrative only and not in a limiting sense.

The invention claimed is:

1. A camera slider assembly for supporting a camera thereon, the assembly comprising:
   a frame including two rails extending in a longitudinal direction, the two rails being parallel and spaced apart in a lateral direction from one another so as to lie within a common lateral plane;
   a carriage body supported on the rails for longitudinal movement along the rails in the longitudinal direction;
   a camera mount supported on the carriage body for supporting the camera thereon for movement with the carriage body in the longitudinal direction relative to the frame;
   a drive wheel rotatably supported on the carriage body for rotation relative to the carriage body about a drive wheel axis which is movable with the carriage body in the longitudinal direction relative to the frame;
   the drive wheel axis being oriented perpendicularly to the common lateral plane of the two rails such that the drive wheel rotates within the common lateral plane of the two rails;
   the drive wheel being in rolling contact with one of the rails such that the drive wheel is rotated as the carriage is displaced in the longitudinal direction; and
   a flywheel supported on the carriage body for rotation relative to the carriage body about a flywheel axis which is movable with the carriage body in the longitudinal direction relative to the frame;
   the flywheel axis being oriented perpendicularly to the common lateral plane of the two rails such that the flywheel rotates within a plane of rotation that is parallel to the common lateral plane of the two rails;
   the flywheel being supported on the carriage body spaced below the common lateral plane of the rails of the frame in non-contacting relationship with the frame opposite from the camera mount above the common lateral plane of the rails of the frame; and
   the flywheel being operatively connected to the drive wheel by a drive assembly so as to be arranged to rotate about the flywheel axis responsive to movement of the flywheel axis with the carriage body in the longitudinal direction relative to the frame and corresponding rotation of the drive wheel as the drive wheel rolls along said one of the rails;
   the drive assembly being configured such that a first rate of rotation of the flywheel about the flywheel axis is greater than a second rate of rotation of the drive wheel about the drive wheel axis.

2. The camera slider assembly according to claim 1 wherein the drive assembly comprises a pulley cable operatively connected between the drive wheel and the flywheel; a pulley portion on the drive wheel that receives the pulley cable and that has a first diameter and a pulley portion on the flywheel that receives the pulley cable and that has a second diameter which is smaller than the first diameter.

3. The camera slider assembly according to claim 2 wherein the first diameter is approximately 4 times larger than the second diameter.

4. The camera slider assembly according to claim 1 further comprising a resilient gripping material supported about a circumference of the drive wheel for gripping the rail as the drive wheel rolls along said one of the rails.

5. The camera slider assembly according to claim 1 wherein a diameter of the flywheel corresponds approximately to a width between the two rails in the lateral direction.

6. The camera slider assembly according to claim 1 wherein the flywheel axis is centered in the lateral direction between the two rails.

7. The camera slider assembly according to claim 1 wherein the flywheel axis is centered in the longitudinal direction relative to the carriage body.

8. The camera slider assembly according to claim 1 further comprising a tripod mounting plate on the frame spaced below the rails for coupling the frame to a tripod head, the flywheel being received between the tripod mounting plate and the rails as the flywheel is displaced along rails with the carriage body.

9. The camera slider assembly according to claim 8 wherein the tripod mounting plate is connected to the two rails by two supporting portions of frame which are connected between laterally opposed sides of the tripod mounting plate and the two rails respectively, the flywheel being supported on the carriage body so as to be received between the two supporting portions of the frame as the flywheel is displaced along the rails with the carriage body.

10. The camera slider assembly according to claim 1 further comprising a brake member pivotally supported on the carriage body for pivotal movement about the flywheel axis between a released position disengaged with the rails such that the carriage body is freely movable along the rails, and a braking position engaged with one of the rails such that movement of the carriage body along the rails is frictionally resisted.

11. The camera slider assembly according to claim 10 wherein the camera mount comprises an upper mounting plate at a top side of the carriage body, and wherein the brake member is supported on the upper mounting plate by a plurality of mounting fasteners extending through respective mounting slots in the upper mounting plate, the mounting slots extending circumferentially about the flywheel axis such that the mounting fasteners are circumferentially displaced along the mounting slots as the brake member is pivoted relative to the upper mounting plate of the carriage body between the released position and the braking position thereof.

12. The camera slider assembly according to claim 10 wherein the flywheel is rotatably supported on the brake member.

13. The camera slider assembly according to claim 12 wherein the brake member includes a hollow cavity therein and an annular bearing member supported within the hollow cavity upon which the flywheel is rotatably supported.

14. The camera slider assembly according to claim 1 wherein a diameter of the flywheel is greater than a diameter of the drive wheel.

15. The camera slider assembly according to claim 1 wherein the drive wheel is received between the two rails and wherein a resilient gripping material is supported about a circumference of the drive wheel in engagement with an inner side surface of said one of the rails for gripping the rail as the drive wheel rolls along said one of the rails.

16. The camera slider assembly according to claim 15 wherein the drive wheel includes a concave groove extending circumferentially about the drive wheel in mating relationship with said one of the rails, and wherein the resilient gripping material is received within the concave groove.

17. A camera slider assembly for supporting a camera thereon, the assembly comprising:

a frame including two rails extending in a longitudinal direction, the two rails being parallel and spaced apart in a lateral direction from one another so as to lie within a common lateral plane;

a carriage body supported on the rails for longitudinal movement along the rails in the longitudinal direction;

a camera mount supported on the carriage body for supporting the camera thereon for movement with the carriage body in the longitudinal direction relative to the frame;

a drive wheel rotatably supported on the carriage body for rotation relative to the carriage body about a drive wheel axis which is movable with the carriage body in the longitudinal direction relative to the frame;

the drive wheel axis being oriented perpendicularly to the common lateral plane of the two rails such that the drive wheel rotates within the common lateral plane of the two rails;

the drive wheel being in rolling contact with one of the rails such that the drive wheel is rotated as the carriage is displaced in the longitudinal direction;

a flywheel supported on the carriage body for rotation relative to the carriage body about a flywheel axis which is movable with the carriage body in the longitudinal direction relative to the frame;

the flywheel axis being oriented perpendicularly to the common lateral plane of the two rails such that the flywheel rotates within a plane of rotation that is parallel to the common lateral plane of the two rails;

the flywheel being spaced apart from the rails in non-contacting relationship with the frame;

the flywheel being operatively connected to the drive wheel by a drive assembly so as to be arranged to rotate about the flywheel axis responsive to movement of the flywheel axis with the carriage body in the longitudinal direction relative to the frame and corresponding rotation of the drive wheel as the drive wheel rolls along said one of the rails;

the drive assembly being configured such that a first rate of rotation of the flywheel about the flywheel axis is greater than a second rate of rotation of the drive wheel about the drive wheel axis; and a brake member pivotally supported on the carriage body for pivotal movement about the flywheel axis between a released position disengaged with the rails such that the carriage body is freely movable along the rails, and a braking position engaged with one of the rails such that movement of the carriage body along the rails is frictionally resisted.

18. The camera slider assembly according to claim 17 wherein the camera mount comprises an upper mounting plate at a top side of the carriage body, and wherein the brake member is supported on the upper mounting plate by a plurality of mounting fasteners extending through respective mounting slots in the upper mounting plate, the mounting slots extending circumferentially about the flywheel axis such that the mounting fasteners are circumferentially displaced along the mounting slots as the brake member is pivoted relative to the upper mounting plate of the carriage body between the released position and the braking position thereof.

19. The camera slider assembly according to claim 17 wherein the flywheel is rotatably supported on the brake member.

20. The camera slider assembly according to claim 19 wherein the brake member includes a hollow cavity therein and an annular bearing member supported within the hollow cavity upon which the flywheel is rotatably supported.

* * * * *